United States Patent
Rozas et al.

(10) Patent No.: US 8,656,214 B2
(45) Date of Patent: Feb. 18, 2014

(54) DUAL PORTED REPLICATED DATA CACHE

(76) Inventors: Guillermo Rozas, Los Gatos, CA (US);
Alex Klaiber, Mountain View, CA (US);
Robert Masleid, Monte Sereno, CA (US)

(*) Notice: Subject to any disclaimer, the term of this patent is extended or adjusted under 35 U.S.C. 154(b) by 699 days.

(21) Appl. No.: 12/786,339

(22) Filed: May 24, 2010

(65) Prior Publication Data

US 2010/0235716 A1    Sep. 16, 2010

Related U.S. Application Data

(63) Continuation of application No. 11/479,630, filed on Jun. 30, 2006, now Pat. No. 7,747,896.

(51) Int. Cl.
*G06F 11/00* (2006.01)
*G11C 29/00* (2006.01)

(52) U.S. Cl.
USPC .......................... 714/6.12; 714/805

(58) Field of Classification Search
USPC .................... 714/6.23, 6, 6.12, 746, 763, 805
See application file for complete search history.

(56) References Cited

U.S. PATENT DOCUMENTS

| | | | |
|---|---|---|---|
| 5,359,557 A | 10/1994 | Aipperspach et al. | |
| 5,784,548 A | 7/1998 | Liong et al. | |
| 5,802,561 A * | 9/1998 | Fava et al. ................ | 711/120 |
| 5,916,314 A | 6/1999 | Berg et al. | |
| 6,044,207 A * | 3/2000 | Pecone et al. ............ | 710/314 |
| 6,134,624 A * | 10/2000 | Burns et al. .............. | 710/316 |
| 6,496,940 B1 | 12/2002 | Horst et al. | |
| 7,340,555 B2 | 3/2008 | Ashmore et al. | |
| 7,409,600 B2 | 8/2008 | Azevedo et al. | |
| 7,441,081 B2 | 10/2008 | Humlicek | |
| 7,444,541 B2 | 10/2008 | Lubbers et al. | |

* cited by examiner

*Primary Examiner* — Shelly A Chase

(57) ABSTRACT

A dual ported replicated data cache. The cache is configured for storing input data blocks. The cache includes an augmenter for producing an augmented data block with parity information from the input data block, a first memory array for storing the augmented data block, and a second memory array for storing the augmented data block.

20 Claims, 4 Drawing Sheets

DUAL PORTED REPLICATED DATA CACHE

CROSS-REFERENCES TO RELATED APPLICATIONS

This application is a Continuation of and claims priority to U.S. patent application Ser. No. 11/479,630, filed on Jun. 30, 2006, which is hereby incorporated by reference in its entirety.

TECHNICAL FIELD

Embodiments relate generally to digital computer systems. More specifically, embodiments pertain to efficiently implementing error correcting cache support for a microprocessor.

BACKGROUND

Server applications of microprocessors often depend on special reliability features since servers have critical data and tend to have high uptimes. Such server applications are generally expected to provide near complete reliability and availability of full functionality 24 hours per day, 365 days per year. Accordingly, the hardware components used to build high reliability server systems is specifically optimized support their expected reliability and availability requirements. Microprocessor caches have proven to be a particularly problematic reliability/availability hardware component. For example, with the increasing scale of integration, microprocessor caches are increasingly prone to alpha-particle soft errors that can alter one or more bits stored therein. Additionally, the minimum required voltage for reliable operation of a given cache changes over the life of the component, increasingly so as the feature size decreases (e.g., increasing levels of integration), which alters the operating conditions of the component and decrease its reliability. Thus, high reliability/availability leads to the use of some form of error correction on caches to protect against such soft errors.

SUMMARY

Embodiments provide a dual ported replicated data cache.

BRIEF DESCRIPTION OF THE DRAWINGS

The accompanying drawings, which are incorporated in and form a part of this specification, illustrate embodiments and, together with the description, serve to explain the principles of the disclosure.

DETAILED DESCRIPTION

Reference will now be made in detail to embodiments, examples of which are illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of embodiments, numerous specific details are set forth in order to provide a thorough understanding of the disclosure. However, it will be recognized by one of ordinary skill in the art that the disclosure may be practiced without these specific details. In other instances, well-known methods, procedures, components, and circuits have not been described in detail as not to unnecessarily obscure aspects of the embodiments.

Notation and Nomenclature

Some portions of the detailed descriptions which follow are presented in terms of procedures, steps, logic blocks, processes, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the disclosure, discussions utilizing terms such as "storing" or "accessing" or "recognizing" or "retrieving" or "translating" or the like, refer to the action and processes of a computer system (e.g., system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
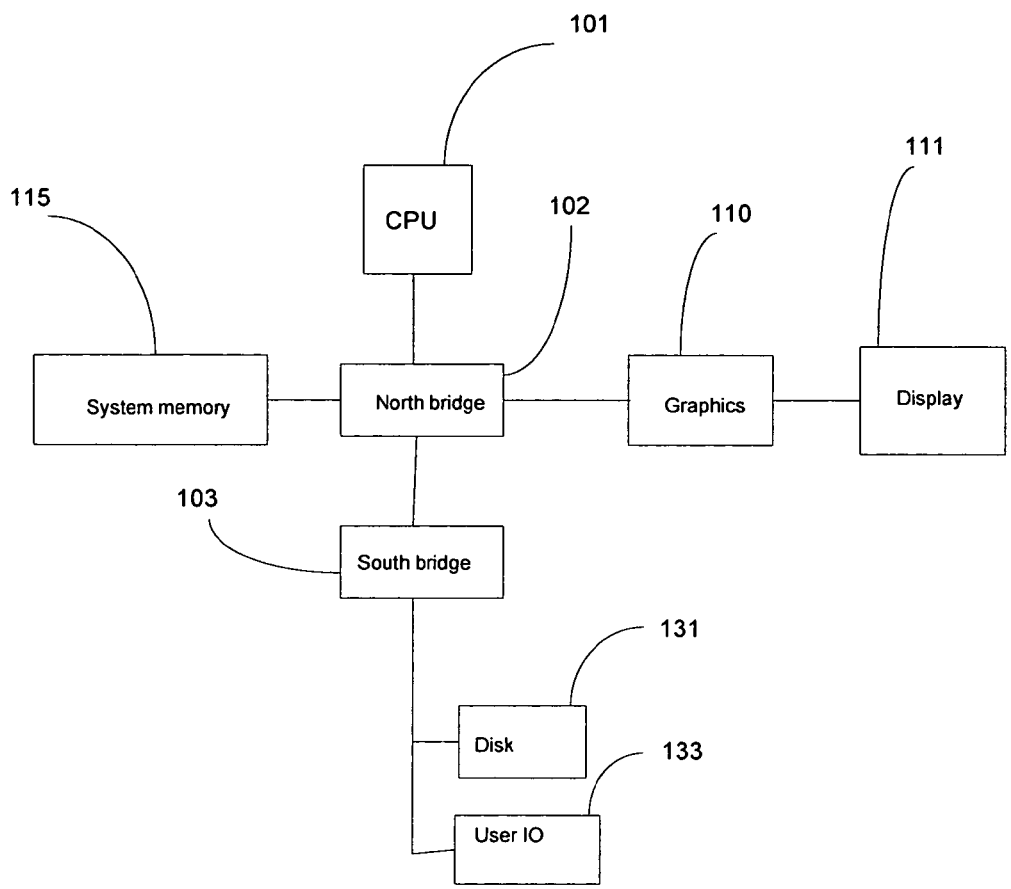
FIG. 1 shows a diagram of a computer system in accordance with one embodiment.

With reference now to FIG. 1, a computer system 100 in accordance with one embodiment is shown. Computer system 100 shows the general components of a computer system in accordance with one embodiment that provides the execution platform for implementing certain hardware/software based functionality. As described above, certain processes and steps can be realized, in one embodiment, as a series of instructions (e.g., software code) that reside within one or more computer readable memory units of a computer system (e.g., system 100). When executed, the instructions cause the system 100 to implement the functionality as described below.

In general, system 100 comprises at least one CPU 101 coupled to a North bridge 102 and a South bridge 103. The North bridge 102 provides access to system memory 115 and a graphics unit 110 that drives a display 111. The South bridge 103 provides access to a coupled disk drive 131 and various user I/O devices 133 (e.g., keyboard, mouse, etc.) as shown.

Figure 2:
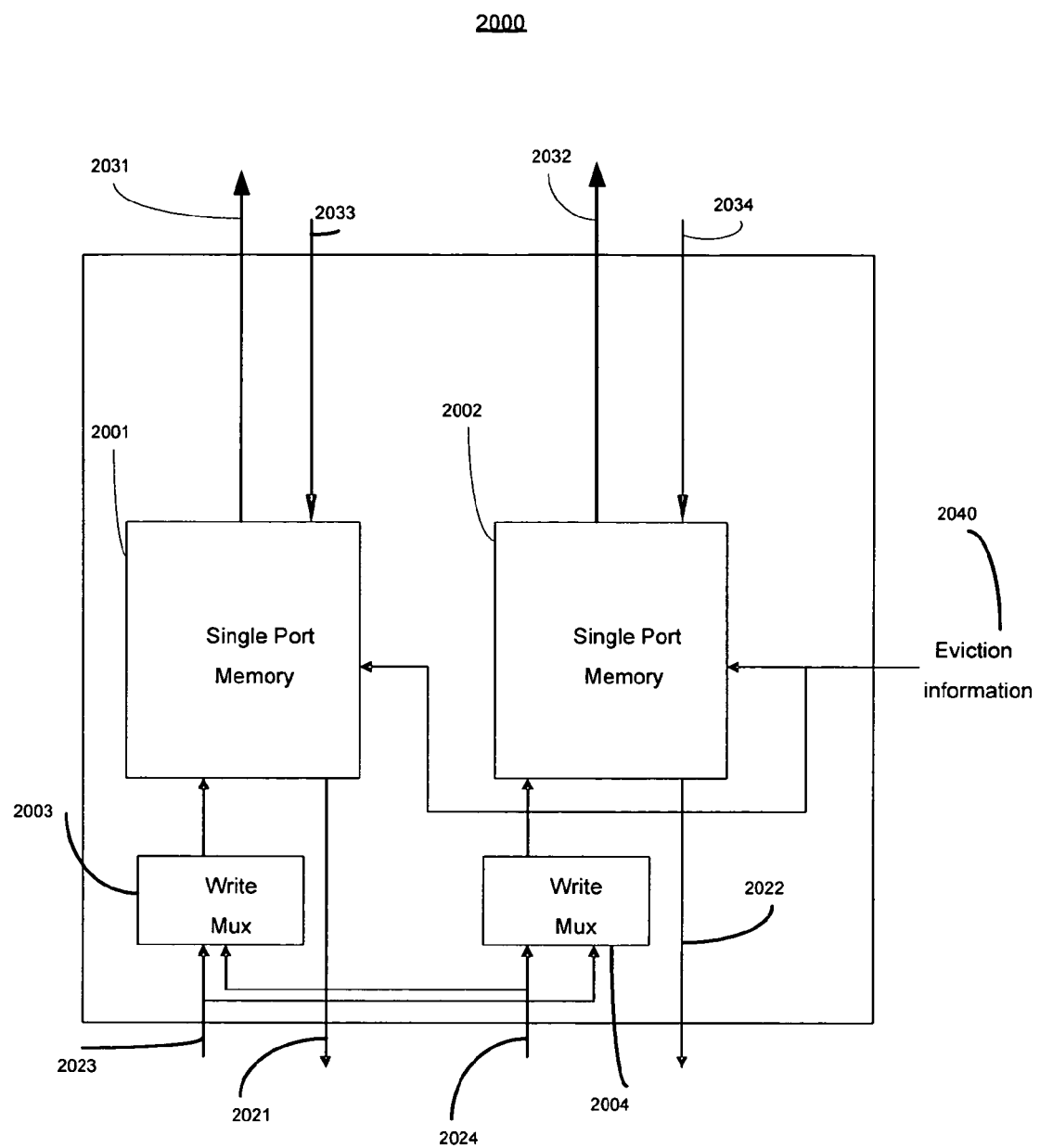
FIG. 2 shows a diagram depicting the internal components of a dual ported cache in accordance with one embodiment.

FIG. 2 shows a diagram depicting the internal components of a dual ported cache 2000 in accordance with one embodiment. As depicted in FIG. 2, the dual ported cache 2000 includes a first and second single port memory 2001 and 2002 coupled to respective write multiplexers 2003 and 2004.

The dual ported cache 2000 of the FIG. 2 embodiment implements the functionality of a dual ported cache by using two memory arrays, the single port memories 2001 and 2002. Dual ported functionality is implemented by the availability of independent loads (e.g., via lines 2021 and 2022) from either of the single port memories 2001-2002. In one embodiment, the single port memories 2001-2002 each comprise an array of single port memory cells (e.g., SRAM, etc.). The first single port memory 2001 is configured to store data blocks (e.g., bytes, double-byte words, cache lines, etc. comprising data, instructions, etc.) and the second single port memory 2002 is configured to store a copy of the data blocks. In this manner, the data stored in the single port memory 2001 is mirrored by the data stored in the second single port memory 2002. The data and the copy of the data can be independently accessed via the first load port 2021 and the second load port 2022 respectively. The write multiplexers 2003-2004 function to maintain coherence between the copies of data stored within the memories 2001-2002 as they store data within the respective memories 2001-2002 via the lines 2023 and 2024 as shown.

In one embodiment, the memories 2001 and 2002 are configured to store small data blocks. As used herein, a small data block refers to a comparatively small amount of data that can be independently accessed and retrieved from either the memory 2001 and 2002, such as, for example, a single byte, a two byte word, and the like. This is a much smaller block of data than what is typically stored in a cache. For example, typical caches store comparatively large blocks of data (e.g., a cache line), typically comprising 128 bytes or more. In contrast, a "cache line" in accordance with one embodiment that is stored in the memories 2001-2002 can comprise a data block, which itself comprises a single byte or two bytes.

As depicted in FIG. 2, the memories 2001 and 2002 can be implemented using a number of different technologies. For example, the memories 2001-2002 can each be implemented as conventional single port caches built using, for example, standardized SRAM arrays (e.g., comprising single port memory cells), that are configured to provide loads via their respective single load ports 2021 and 2022. Other memory technologies can be used (e.g., DRAM, FLASH, etc.).

Referring still to FIG. 2, the memories 2001-2002 are shown with additional load and store lines 2031-2032 and 2033-2034. The lines 2031-2034 are shown to illustrate the fact that the dual ported cache 2000 can be configured to implement write-back caching and/or write-through caching. For example, the dual ported cache 2000 can implement a write back cache policy wherein a write is made to the next hierarchical level of memory (e.g., system memory, etc.) to copy back data to the upper hierarchical level when a given storage location within the dual ported cache 2000 needs to be used by new data. In one embodiment, control of when a given data block needs to be written back to the upper hierarchical level is implemented using eviction information 2040, that can be provided by, for example, an eviction manager (e.g., eviction manager 3021 shown in FIG. 3), external memory controller, or the like. Alternatively, the dual ported cache 2000 can implement a write-through cache policy wherein each data block that is written to the dual ported cache 2000 is also written through to the upper hierarchical level.

Additionally, in one embodiment, the lines 2033-2034 can also be used to implement a separate and independent fetching of data blocks from the upper hierarchical level irrespective of any loads provided via the load ports 2021 and 2022. The independent fetching can be used to implement a prefetching algorithm to predictively store data blocks which may subsequently be used.

In this manner, the dual ported cache 2000 can support dual ported access to cached data in a number of different hierarchical memory schemes. For example, the dual ported cache 2000 can be used to implement a level 1 cache or a level 2 cache within, for example, a microprocessor (e.g., CPU 101) of a computer system (e.g., computer system 100). Similarly, the dual ported cache 2000 can be used to implement a data cache or instruction cache within a graphics processor unit (e.g., graphics processor 110). Additional examples include an embodiment where the dual ported cache 2000 is included within a memory controller of the Northridge (e.g., Northridge 102) and is used to cache data from system memory (e.g., system memory 115), and an embodiment where the dual ported cache 2000 is included within a disk drive (e.g., disk drive 131) of the computer system 100.

Figure 3:
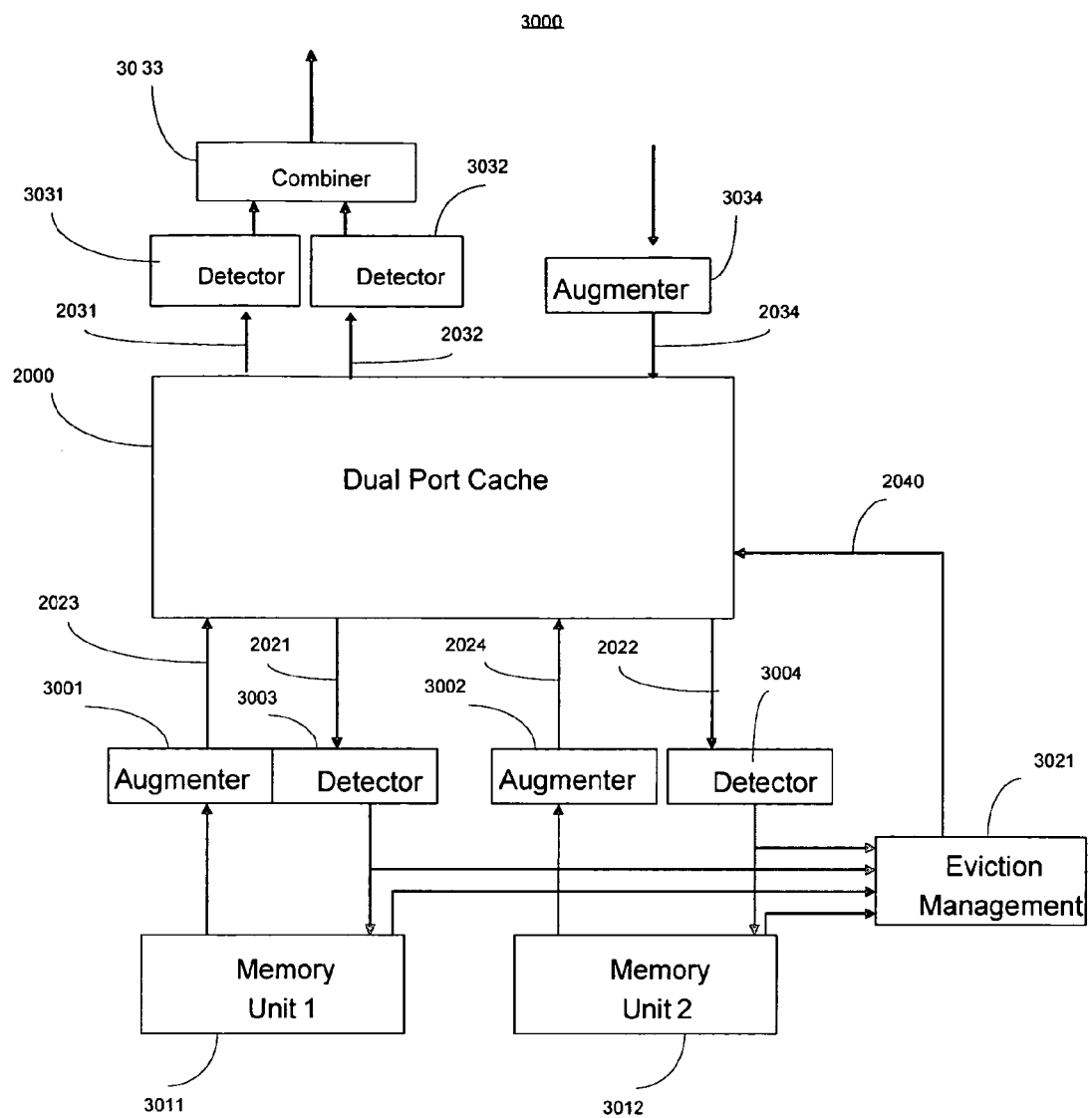
FIG. 3 shows a diagram of a dual ported cache system having error detection and correction capability (ECC) in accordance with one embodiment.

FIG. 3 shows a diagram of a dual ported cache system 3000 having error detection and correction capability (ECC) in accordance with one embodiment. As depicted in FIG. 3, the dual ported cache system 3000 includes the dual ported cache 2000 and includes additional components 3001-3034 which provide an error detection and error correction capability.

In the FIG. 3 embodiment, access to the dual ported cache 2000 is via a first memory unit 3011 and a second memory unit 3012. The memory units 3011 and 3012 function by managing access to and from the memories 2001-2002 (shown in FIG. 2) respectively. The memory units 3011-3012 provide access to the dual ported cache 2000 in such a manner as to enable dual ported access functions (e.g., to provide independent access to the first single port memory 2001 and the second single port memory 2002 via the load ports 2021 and 2022). The memory units 3011-3012 are coupled to write data to the dual ported cache 2000 via the lines 2023-2024 as shown.

In the FIG. 3 embodiment, two augmenters 3001 and 3002 are coupled on lines 2023 and 2024. The augmenters 3001-3002 function by augmenting the data blocks written into the cache 2000 with error correction information. For example, as data blocks are received from the memory units 3011-3012, each of the data blocks is augmented with error detection/error correction information that is configured to enable the detection of an occurrence of an error within the data block upon a subsequent read of the data. The augmented data blocks are stored within the memories 2001-2002.

The data blocks are read from the load ports 2021-2022 via respective detectors 3003 and 3004, which function by examining the added error correction information to determine whether an error has occurred. Similarly, detectors 3031-3032 and a combiner 3033 (e.g., which combines the identical data blocks from the memories 2001-2002) are coupled on lines 2031 and 2032 to detect errors on, for example, a write-back operation, and the augmenter 3034 is coupled to lines 2033 and 2034 to add error detection/error correction information to any stores into the cache 2000 from the upper hierarchical level (e.g., prefetches, etc.).

In one embodiment, the ECC used by the augmenters/detectors 3001-3004, 3031-3032, and 3034 comprises a parity checking ECC scheme whereby one or more parity bits are added to each of the data blocks as they are stored within the cache 2000.

In the FIG. 3 embodiment, the ECC capability is provided through the operation of the detectors 3003-3004 and the detectors 3031-3032 in conjunction with an eviction manager 3021. The eviction manager 3021 is configured to manage the write-back and/or write-through policy of the cache system 3000. Additionally, the eviction manager 3021 also manages the replacement of any defective or altered data block in the cache 2000. For example, in one embodiment, upon the detection of an error on a load from the cache 2000 by any of the detectors 3003-3004 and 3031-3032, a signal can be sent to the eviction manager 3021 which causes the offending data block to be evicted from the cache 2000 and discarded. Subsequently, a fresh error-free copy of the data block can be fetched from external memory, such as, for example, the upper hierarchical level (e.g., system memory, disk storage, etc.) and stored into the cache 2000.

In this manner, the cache system 3000 can efficiently detect and correct the occurrence of errors within the data blocks stored within the dual ported cache 2000. For example, in a case where the data blocks are small data blocks as described above (e.g., one byte data blocks, or the like) the cache system 3000 can detect bit errors within, for example, every byte stored within the cache 2000.

Figure 4:
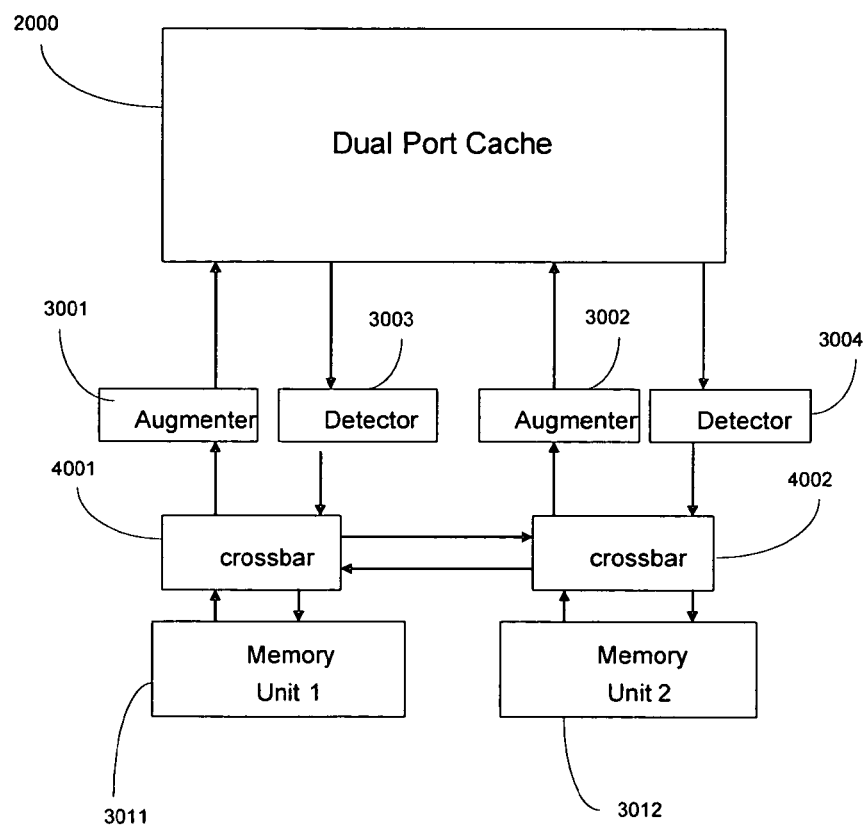
FIG. 4 shows a diagram of a dual ported cache system having a high-performance configuration error detection and correction capability (ECC) in accordance with one embodiment.

FIG. 4 shows a diagram of a dual ported cache system 4000 having a high-performance configuration ECC capability in accordance with one embodiment. As depicted in FIG. 4, the dual ported cache system 4000 is substantially similar to the dual ported cache system 3000 of FIG. 3; however, system 4000 includes a first crossbar 4001 and a second crossbar 4002 which significantly speeds up the error correction capability of the system 4000 in comparison to the system 3000.

In the FIG. 4 embodiment, upon the detection of an error within a data block of the cache 2000 (e.g., by the detectors 3003-3004) the crossbars 4001-4002 can function as retrieval means that cause the defective data block to be ignored while a copy of the correct data block is retrieved from the opposite load port. For example, upon the detection of an error, since the data within the memories 2001-2002 are copies of one another, the faulty data can be ignored while a copy of the correct data is retrieved from the unaltered memory. The faulty data can then be overwritten with the correct data via the appropriate augmenter. Thus the system 4000 embodiment is able to correct an error within a data block without forcing a subsequent access to the upper hierarchical level of memory, as would be the case in the system 3000 embodiment.

In this manner, embodiments solve a number of problems existing in typical solutions. For example, server applications of microprocessors often depend on special reliability features since servers have critical data and tend to have high up-time requirements (e.g., 24 hours a day, seven days a week, 365 days a year). Soft errors provided specifically challenging problem, in particular, alpha-particle soft errors that can alter bits within caches. Accordingly, typical implementations included different forms of error correction for their caches. Each of the solutions had problems.

For example, the implementation of byte-level ECC is costly in area as it greatly increases the size of the cache by a factor of 13/8. This increase in area provides no other advantage (e.g. simplicity or speed). Similarly, the used of read-modify-write sequences for small units, where a store occurs to a unit smaller than the unit for which the ECC is computed, causes the store to occur in three steps, namely read the old data, merge in the small units being stored, and store the merged data with the new ECC. Such a solution is both complex and slow in a main part of the machine (e.g., the microprocessor cache), increases active power as stores have to do more work, and lowers performance as sub-unit stores take up two cache accesses (a read and a write).

Another example would be a case where a first-level cache is implemented such that it is write-through and uses parity protection, such that a data cache is parity protected (byte parity is easy to compute in small writes) and as such provides no error correction, just detection. In such a solution, all stores would be sent to the data cache and also to the next level of the memory hierarchy (L2 or system memory). Thus on a parity error on the data cache, the data is invalidated from the data cache and fetched back from the next level in the memory hierarchy. Such a solution increases power and complexity. For example, the rate of storing into the L2 cache is much higher since the data cache no longer serves as a store aggregator, and a cache fill into the data cache may be merged with partial pending writes to the cache line on the way to the L2

Embodiments provide a superior solution to the above problems with respect to both complexity and/or performance. As described above, embodiments function in part by replicating the data stored within the cache 2000 and adding ECC (e.g., byte parity) to it. That is, there are two copies of the data and per-byte parity has been added to each copy. Thus, when a parity error is detected on one half, there is another copy that can be used to restore the data. The probability that there is a parity error in the corresponding byte in the other copy is extremely low.

In the FIG. 3 and FIG. 4 embodiments, writes are stored into both memories 2001-2002, but the two copies provide independent load ports, thus alleviating any reason to make the cache 2000 write-through. Additionally, two independent load ports lead to faster load timing as each of the two copies can be optimally placed next to the memory unit (e.g., member units 3011-3012) that uses the load port, and the complexity and area penalty of implementing multiple load ports out of a single array is eliminated.

It should be noted that although at first glance the FIG. 3 embodiment may seem like an area-intensive solution, it is not unusual for true dual-ported cache to take up approximately 50% more area than single-ported cache (e.g., larger SRAM cell and additional logic reducing their space efficiency). Furthermore, it should be noted that if one wants to implement a write-back dual-ported cache with soft error protection and using small writes, one would have to use byte-ECC as described above. This would increase the area by more than 50%. Thus, the replication plus parity attribute as described in the FIG. 3 embodiment is area-competitive and much simpler from a complexity point of view.

It should be noted that another advantage of replication vs. the traditional solution for dual porting is that a replicated data cache allows a given integrated circuit (e.g., CPU 101, and the like) to use the same SRAM cell (e.g., a fundamental SRAM panel) for all the caches (e.g., data cache, instruction cache, L2, L3, etc.) since the dual porting is achieved by replication and not by designing a custom SRAM cell. Thus it is a more portable solution from one fabrication facility to another fabrication facility.

The foregoing descriptions of specific embodiments have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the claims appended hereto and their equivalents.

What is claimed is:

1. An apparatus comprising:
a first memory array operable to store data and operable to connect to a next higher hierarchical level of memory;
a second memory array operable to store a copy of the data and operable to connect to the next higher hierarchical level of memory;
a first multiplexer coupled to the first memory array and operable to send the data to the first memory array to store therein, wherein the first memory array is operable to bypass the first multiplexer in response to outputting a requested data of a first read operation; and
a second multiplexer coupled to the second memory array and operable to send the copy of the data to the second memory array to store therein, wherein the second memory array is operable to bypass the second multiplexer in response to outputting a requested copy of data of a second read operation, wherein the first and second multiplexers are operable to maintain coherence between the data in the first memory array and the copy of the data in the second memory array.

2. The apparatus of claim 1 further including:
a first output coupled to the first memory array; and
a second output coupled to the second memory array, wherein the first output operates independently of the second output.

3. The apparatus of claim 2 further including:
a first input coupled to the first and second multiplexers; and
a second input coupled to the first and second multiplexers.

4. The apparatus of claim 3, wherein the first input and the first output form a first port.

5. The apparatus of claim 3, wherein the second input and the second output form a second port.

6. The apparatus of claim 1, wherein the first memory array is further operable to store first error correction information for the data, and wherein the second memory array is further operable to store second error correction information for the copy of the data.

7. The apparatus of claim 1, wherein the data includes a plurality of data blocks, and wherein the data blocks are between 1 and 128 bytes in size.

8. The apparatus of claim 1, wherein the copy of the data includes a plurality of data blocks, and wherein the data blocks are between 1 and 128 bytes in size.

9. A dual ported cache, comprising:
a first single-ported cache configured to store data and configured to connect to a next higher hierarchical level of memory;
a second single-ported cache configured to store a copy of the data and configured to connect to the next higher hierarchical level of memory;
a first multiplexer coupled to the first single-ported cache and operable to send the data to the first single-ported cache to store therein, wherein the first single-ported cache is configured to bypass the first multiplexer in response to outputting a requested data of a first read operation; and
a second multiplexer coupled to the second single-ported cache and operable to send the copy of the data to the second single-ported cache to store therein, wherein the second single-ported cache is configured to bypass the second multiplexer in response to outputting a requested copy of data of a second read operation, wherein the first and second multiplexers are configured to maintain coherence between the data in the first single-ported cache and the copy of the data in the second single-ported cache.

10. The dual ported cache of claim 9 further including:
a first output coupled to the first single-ported cache; and
a second output coupled to the second single-ported cache, wherein the first output operates independently of the second output.

11. The dual ported cache of claim 10 further including:
a first input coupled to the first and second multiplexers; and
a second input coupled to the first and second multiplexers.

12. The dual ported cache of claim 11, wherein the first input and the first output form a first port.

13. The dual ported cache of claim 11, wherein the second input and the second output form a second port.

14. The dual ported cache of claim 9, wherein the first single-ported cache is further configured to store first error correction information for the data, and wherein the second single-ported cache is further configured to store second error correction information for the copy of the data.

15. The dual ported cache of claim 9, wherein the data includes a plurality of data blocks, and wherein the data blocks are between 1 and 128 bytes in size.

16. The dual ported cache of claim 9, wherein the copy of the data includes a plurality of data blocks, and wherein the data blocks are between 1 and 128 bytes in size.

17. A method comprising:
storing data in a first memory array operable to connect to a next higher hierarchical level of memory;
storing a copy of the data in a second memory array operable to connect to the next higher hierarchical level of memory; and
using a first multiplexer and a second multiplexer to maintain coherence between the data in the first memory array and the copy of the data in the second memory array, wherein the first multiplexer is operable to send the data to the first memory array to store therein, wherein the second multiplexer is operable to send the copy of the data to the second memory array to store therein, wherein the first memory array is operable to bypass the first multiplexer in response to outputting a requested data of a first read operation, wherein the second memory array is operable to bypass the second multiplexer in response to outputting a requested copy of data of a second read operation, wherein said using includes:
coupling the first multiplexer to the first memory array, and
coupling the second multiplexer to the second memory array.

18. The method of claim 17, further comprising:
storing first error correction information for the data in the first memory array; and
storing second error correction information for the data in the second memory array.

19. The method of claim 17, further comprising:
operating a first output coupled to the first memory array independently of a second output coupled to the second memory array.

20. The method of claim 19, further comprising:
coupling a first input to the first and second multiplexers; and
coupling a second input to the first and second multiplexers, wherein the first input and the first output form a first port, and wherein the second input and the second output form a second port.

* * * * *